April 9, 1957
E. J. STERNGLASS
2,788,452
THERMAL IMAGE DETECTING TUBE
Filed July 29, 1952
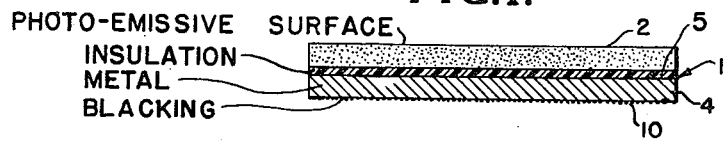
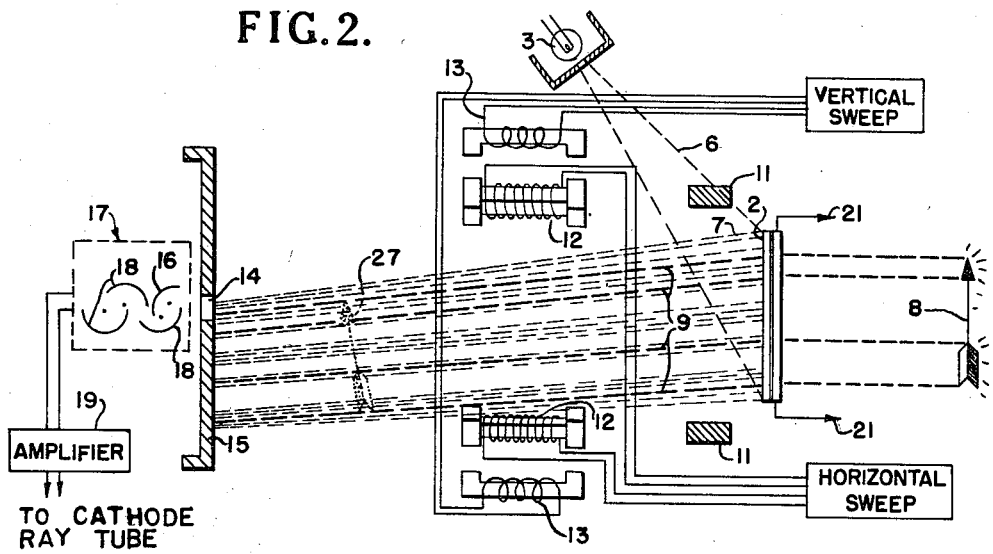
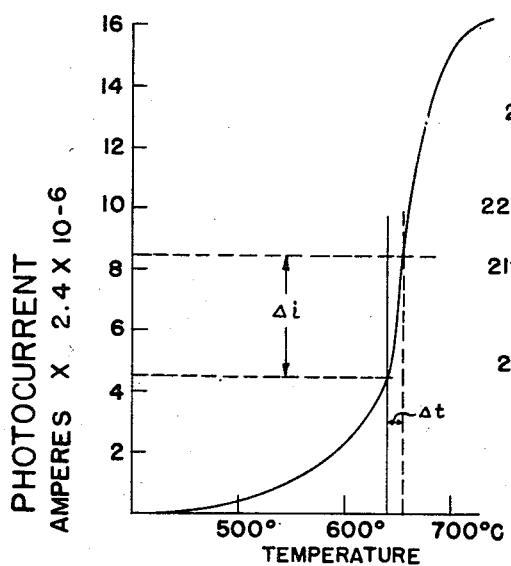
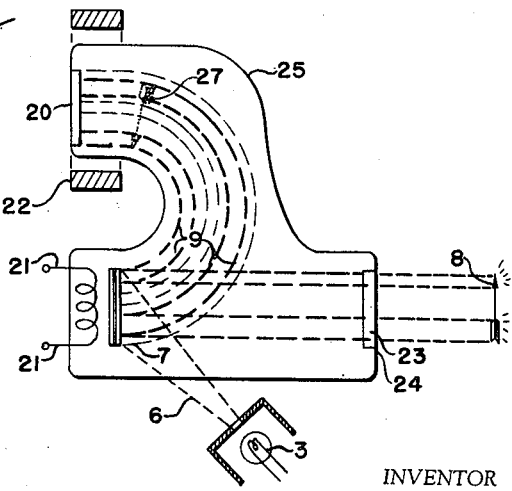
INVENTOR
ERNEST J. STERNGLASS
BY
ATTORNEYS United States Patent Office 2,788,452
Patented Apr. 9, 1957

2,788,452
THERMAL IMAGE DETECTING TUBE

Ernest J. Sternglass, Ithaca, N. Y.

Application July 29, 1952, Serial No. 301,619

6 Claims. (Cl. 250—83.3)

(Granted under Title 35, U. S. Code (1952), sec. 266)

The invention described herein may be manufactured and used by or for the Government of the United States of America for governmental purposes without payment of any royalties thereon or therefor.

This invention pertains to a thermal image detection method, and to an apparatus incorporating the principles thereof and more particularly to a method and apparatus by which an object not visible to the naked eye may be detected by virtue of the heat radiation thereof and a visual image presented for viewing.

Prior infrared image detecting tubes have been limited in their sensitivity to regions of the infrared spectrum close to the visible spectrum. These devices have, for the most part, incorporated conventional photoelectric units wherein radiation strikes a sensitive surface to produce a resultant electron emission of a magnitude proportional to the intensity of the radiation. The emitted electrons are thereafter focused on a phosphorescent screen to produce a visual image thereon.

In alternative prior systems electron emission has also been utilized to produce electrical impulses corresponding to the point by point characteristics of the image, which are thereafter utilized by devices incorporating scanning arrangements, to display a visual image on a cathode ray tube.

The energy sensitive surfaces as used in these prior devices are generally operated at ambient temperature with consequent sensitivity limitations, in a given application, corresponding to the response characteristics of the particular surface utilized in the spectral region of the desired wave length.

Other prior art attempts at producing similar results have included methods and apparatus utilizing the change in resistance of a semiconducting film in order to produce an electrical signal corresponding to the image. The results obtained by this latter method have not been all that might be desired since the sensitivity and definition have not been completely satisfactory for the reason that the response of this type surface to heat radiation of very long wave length, as is frequently required or desirable, is relatively poor. This defect in the outlying spectral region is further accompanied by low sensitivity even in regions of the spectrum where response exists. Also these devices of other than photoelectric character which operate on a resistance change principle provide poor definition of image and sluggishness of operation when compared with the photoelectric effect type of unit.

The principle of operation of the instant invention in which a tube is used to utilize the "anomalous" photoelectric emission obtained from a semi-conductor, blocking layer, metal backing type surface at elevated temperatures resides in subjecting the surface to an external source of light radiation to increase the infrared sensitivity thereof. The construction of such a surface comprises a metal foil element onto which a thin, high resistant film is deposited. Thereafter the layer of semiconducting substance as, for example, barium oxide is deposited in coating relationship to provide layers of the order of a few thousand molecular layers in thickness.

In the normal coating process, such as evaporation in a vacuum, the deposited layer of semi-conductor compound, such as barium oxide, develops into a complex surface containing a stoichiometric excess of free metal atoms over the metal atoms combined in the molecules of the compound. These surfaces are such as the surfaces described in an article entitled Photoelectric properties of composite surfaces at various temperatures and potentials, by D. Ramadanoff appearing in vol. 37 of the Physical Review at page 884. This surface is thereafter subjected to temperatures sufficient to reach a certain critical value therefor which depends on the nature of the material and may be in a range between 600° to 800° C. Simultaneously with this temperature elevation the surface is irradiated with a light from a source having characteristics substantially within the absorption spectrum of the element or cell surface at the temperature to produce a photoelectric characteristic possessing a very sharp rise in photoelectric current, the effects of which may reach a magnitude in the order of hundreds of times the value of the photoelectric current effect at normal room temperature within a narrow temperature range.

When a surface of this character is caused to remain at a constant temperature just below or in the beginning of the critical region, any radiant energy of any frequency falling onto such a surface will produce a local rise in the temperature thereof with a resultant rise of appreciable proportion in the electron emission therefrom. The electron emission under such conditions is proportional to the intensity of the additional radiation applied thereto. The advantageous utilization of this method resides in the use of a thin sensitive film layer and operating under conditions correlative thereto, wherein the heat capacity of the surface is sufficiently small, in order that the energy requirements to raise the surface by a detectable amount is also relatively small and the time lag with respect thereto can be held to very small limits. In ultimate usage of the sensitive element for image detection, the temperature conditioning is maintained by use of a suitable heater for the surface. Additional sensitivity is thereafter obtained by use of a constant intensity light source, the rays of which are directed onto one surface of the sensitive element to provide initial electron emission. Subsequent subjection of the element to infrared heat radiation thereupon produces increased electron emission from local areas subjected to this radiant energy. The increased emission, as thereafter detected to provide electrical signal output, is indicative of the outline and configuration of the object.

One object of the instant invention resides in the provision of means responsive to the application thereto of radiant energy for the detection of heat radiation from an object, and further producing a visual image thereof of objects otherwise invisible to the naked eye.

Another object of the present invention resides in the use of a photosensitive complex film at elevated temperatures to provide improved image detection in the infrared region of the radiant energy spectrum.

A further object of the invention resides in the use of a device which is sensitive in the infrared spectral energy region to produce a visual image for display at said device and at places remote thereto.

Still another object lies in a new and improved infrared energy sensitive detection and display device which materially overcomes many of the disadvantages of devices heretofore or now in general use, while providing substantially all of the advantages thereof with appreciably improved sensitivity thereover.

An additional object of this invention resides in a new and novel means for providing increased heat energy sensitivity in an energy producing radiant energy detection device.

Another object of this invention is to provide an image producing device which is sensitive to radiation over a wide range of frequencies and which is dependent only on the power in said radiation.

It is an additional object of this invention to provide an image producing device for infra-red spectral energy which is inherently very sensitive, and independent in sensitivity to the spectral distribution of radiation supplied thereto.

It is also an object of this invention to provide an image producing device for displaying the projected representation of an object emitting heat radiation which is capable of compact construction.

A further object resides in the provision of a detector means which is sensitive farther into the infra-red region of the spectrum than other known devices using similar or different principles of operation.

An additional object of this invention lies in the use of a low heat capacity photosensitive film at elevated temperatures whereby the time lag of the device is reduced to very small values.

Other objects and attendant advantages will be apparent to one skilled in the art or will become apparent when the same is taken with respect to the description and accompanying drawings wherein:

Fig. 1 is a view in cross section of a photosensitive layer element of the instant invention;

Fig. 2 is a diagrammatic view showing the mode of operation of a preferred embodiment of the invention and illustrates the manner of subjecting the film to sensitizing light and infrared thermal radiation;

Fig. 3 is a modified form of the invention showing the sensitive layer element of Fig. 1 as incorporated in an image producing tube;

Fig. 4 is a curve showing graphically the output relationships of photoelectric current produced at elevated temperatures.

Referring now to Fig. 1 there is shown in cross section a photosensitive complex surface element or cell 1, having a photoemissive side at 2 which is subject to a constant source of illumination such for example as the lamp 3 shown in Fig. 2.

This electron emission surface is of a semiconducting material such, for example, as barium oxide (BaO) which is deposited as a strata of the order of a few thousand molecular layers in thickness on the thin high resistance insulating film 5. The semiconduction layer is thus electrically separated from the metallic film backing electrode 4 by this thin insulating layer 5. The metal film may be of the order of .0005 inch in thickness.

The outer surface of the metallic film is suitably coated with black surfacing material to provide an effective "ideal black body" at 10 on this surface.

The change in photocurrent with a rise in temperature of a complex surface 1 of Fig. 1, is shown by the curve of Fig. 4. It accompanies the light energy irradiation of the film into the region wherein any radiant energy of any frequency impinging thereon will be absorbed by the material and raise its temperature a finite amount as hereinbefore set forth. This also functions to sensitize the surface in a manner to produce a local rise in temperature corresponding to the localized area of the radiant energy impingement and thereby produce an increase in electron emission proportional to the intensity of the radiant object. Fig. 4 shows a curve representing this effect wherein the abscissa indicates temperature in degrees centigrade and the ordinate of the graph when multiplied by $2.4 \times 10^{-6}$ represents the photocurrent in amperes under condition of constant illumination with visible light in the frequency band range of the semiconducting material. It is this relationship which is advantageously utilized in the instant example wherein $\Delta t$ is the assumed incremental change in temperature, while $\Delta i$ is a corresponding incremental change in photocurrent. It is therefore apparent that if the heat capacity of such a surface is kept sufficiently small by use of a thin film layer, only a small amount of radiant energy is required to raise the surface temperature by a detectable amount and provide photoelectric electron emission from the incremental area of the element which is subject to increased radiation. In practice, time lag can be held to relatively small limits for a particular application by proper selection of a sensitive film as hereinabove described which provides the above mentioned low value of heat capacity for the surface.

The embodiment of the instant invention illustrated in diagrammatic form in Fig. 2 shows the light sensitive cell element 1 mounted in a manner whereby it is subjected to a continuously applied constant intensity light from source 3, the beam 6 of which is directed against the electron emissive surface 2 of the cell. The electron beam, as illustrated at 7 to represent emissions from the fixed source radiation beam 6, functions in conjunction with the heater arrangements at 21 to provide an operating level of high sensitivity for the device. The combined effects of heating to a predetermined temperature by heater 21 and irradiating the electron emissive surface of the cell with light having spectral characteristics falling within the absorption band of the sensitive layer, as hereinbefore set forth, renders the cell active with respect to subsequently applied thermal-energy radiations. Thereafter the increase in electron emission from the area of the film activated by infra-red radiations from the object 8 is correlative with the intensity of the radiation therefrom. These radiations which produce the electron emission pattern diagrammatically illustrated at 27 under subjection to infra-red or heat radiation from the heated object 8 are added to the emission 7 from the cell under action of the light source 3, with energy bombardment therefrom represented as 9 for ultimate utilization in any desired manner.

A system for utilization of this electron pattern is shown for purposes of illustration and includes the magnetic focusing device 11 and deflection coils 12 and 13 respectively, to provide focusing and horizontal and vertical deflection of the electron beams 7 and 9 which include the pattern 27, by yoke circuitry of conventional character and connected into suitable sweep oscillator circuitry in a conventional manner. The light aperture 14 is provided in the shield element 15. The entire image beam or electron picture 27 is swept across this aperture in element by element relation. As the electron energy indicative of incremental image pattern intelligence crosses the small aperture it functions to activate electron sensitive surfaces at 16 to produce electrical output signals from the electron multiplier 17, which are correlative with the entire electron emission energy in the picture when the pattern of the beam is subsequently displayed as incremental images which are similarly swept in a cathode ray tube to produce a composite picture. The electrons passing through the aperture during the sweep cycle are directed against a first photocathode surface 16 of the electron multiplier 17 which comprises a plurality of plates and light sensitive photocathode elements 18 each of which successively responds to reflected electron energy and functions in correlation with the others to increase the output electrical signal energy level therefrom. The output of the last stage of the electron multiplier 17 may be applied as an input to a conventional signal amplifier shown in block form at 19 and utilized in any desired manner such, for example, as ultimate display on a cathode ray tube.

An additional embodiment or modification of the instant invention is shown in Fig. 3 wherein the emitting side and the irradiated side of the film coincide and the indirectly heated surface 10, adjacent the heater 21 therefor is disposed at the opposite side thereof. This embodiment of the invention further incorporates a tube configuration which departs from that of Fig. 1. The construction and positional relationship in which certain parts are disposed is such as to provide an advantageous compact arrangement in a relatively short tube envelope of glass or other suitable material in which the electron path is curved in space as provided by the magnetic field device 22 which applies control over the electron emission beam 7 in a direction perpendicular to the plane of Fig. 3 of the drawings. The image may be presented for viewing at the phosphorescent screen 20, as shown. This bent tube arrangement is equally well adapted for utilization with an image scanning system of Fig. 2 in which case the image is deflected similarly as the embodiment of Fig. 2 and is swept across an aperture similar to aperture 14, in a suitable shield by action of deflection coils not shown but equivalent to 12 and 13. The electron image pattern 27 existing in a cross section of the emission beam is therein swept across the aperture adjacent the electron multiplier assembly 17 similarly as hereinbefore described.

In the embodiment of Fig. 3 the radiant heat energy is directed through a transparent window 23 in one portion at 24 of the tube 25 in axial alignment with the sensitive surface 10 of the cell unit.

The operation of the invention which is equally applicable to either Fig. 2 or Fig. 3 utilizes the radiation from the radiant heated object 8 to increase the emission of electrons from the metallic barrier surface. This great increase in electron emission which results from the localized additional heating, is indicative by the intensity distribution thereof of the configuration of the original object. These electrons are collected similarly by the electron multiplier 17, as the whole "electron picture" is swept across the small opening or aperture 14 in the mask or shield 15. The sweep as applied by the deflection circuit presents this picture to the multiplier in an element by element relationship. The signal output of the multiplier may thereupon be amplified and subsequently utilized in any desired manner.

If desired the output derived from either of the illustrated embodiments may be used in television applications for the reproduction of thermal images.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A radiant energy image detection and display device for the detection of thermal radiation in combination with a sensitive element, an external light source maintaining said device photoelectrically active, a detection element having a complex photo- and thermo-electron emission surface, said detection element also having an image receiving surface coextensive with said complex surface and attached thereto by an insulating film, said light source irradiating said complex surface, means for heating said emission surface to a threshold condition of electron emission, horizontal and vertical deflection means for providing sweep control of the electrons emitted therefrom, focusing means for said electron beam, a mask having an aperture through which a portion of said beam is permitted to pass, an energy sensitive electron multiplier operatively associated with said aperture in a manner to provide an electrical signal indicative of intensity changes in said electron beam as the beam is swept section by section across the aperture, the signal output from said electron multiplier being adapted for amplification and for purposes of ultimate display on a cathode ray tube.

2. In combination, a complex photoelectric and thermo-emissive surface, a source of constant illumination directed thereon, said illumination being of a frequency at least as high as the photoelectric threshold frequency of the surface material, means for heating said surface to substantially the threshold temperature of thermal electron emission, said illumination producing a photoelectric effect such that small additions of thermal energy to said element produce a large emission of electrons from said surface, means for controlling the beam path of electrons emitted from said surface while said surface is additionally exposed to radiated heat energy from a source body, said electron beam corresponding in cross section to the image of said body, beam scanning means, means for translating the emission energy of successively scanned portions of said image into electrical signals applicable upon amplification for display on a cathode ray tube, and means for applying portions of said beam incrementally to said translating means to supply the image section by section thereto.

3. A radiant energy image detection and display system comprising, in combination, an infra-red light energy sensitive means having a photo- and thermo-emissive surface, heater means providing an elevation in the temperature of said surface to substantially the thermionic threshold temperature of the surface material, a source of illumination having a frequency at least as high as the photoelectric threshold frequency of said surface directed against said surface of said sensitive means to provide an initial level of electron emission therefrom and to bias the surface to a state of additional electron emission when the sensitive means is additionally subjected to thermal energy radiated from a source object.

4. A thermionic radiant energy image detection and display system comprising a sensitive detection element responsive to photonic and thermal energy and having a complex electron emission surface, means for heating said surface substantially to the thermionic threshold, a source of photoelectrically active radiation applied to said surface providing an initial electron emission from said surface thereby biasing the surface to a state of infrared sensitivity such that a small addition of infra-red energy will produce a large increase in electron emission, sweep means providing deflection control of the composite electron beam emitted therefrom with additional subjection of the sensitivity element to an infrared radiant energy source, focusing means for said electron beam, means providing an aperture through which successive portions of said beam are permitted to pass in a scanning relationship as provided by said sweep means, and an electron energy sensitive signal multiplier operatively associated with said apertured means to provide an electrical signal indicative of intensity changes in said electron beam as the same is swept across the aperture, said intensity changes being produced by the detection element in correlation to infrared thermal radiations impinged thereon, said electrical signal being of a character adapted for amplification and display purposes on a cathode ray tube.

5. In combination with a thermal image detection tube of a character having a complex photo- and thermo-emissive surface therein, a source of light energy impinging on said surface, said light energy having a frequency at least as high as the photo-electric threshold frequency of the material of said surface, said tube comprising means for heating said surface to substantially the thermionic threshold temperature thereof, means applying thermal energy from a source to be detected by said surface, means for collecting successive portions of the electron beam emitted therefrom when this surface is exposed to radiant thermal energy from a source body, said beam corresponding to the production of the image of said body, means for scanning said beam portion by portion with respect to said electron collecting means, means for translating the emission energy of successively scanned portions of said image into electrical signals applicable upon amplification for display on a cathode ray tube, and means for directing said beam with respect to said translating means to enable the application of the electron image section by section to the collector means.

6. In combination in a thermo-image detecting device, means including a thin layer of semi-conductive material having a complex photo-emissive surface, said means also including a second surface having a low heat capacity, filamentary heater means for activating the complex surface to substantially the thermionic threshold temperature of the surface, thereby conditioning said surface to respond to low level infra-red radiation, means for irradiating said complex surface with light having a frequency at least as high as the photoelectric threshold frequency for the material of said photoemissive surface to provide an amplified detectable image signal output from said surface, thereby to bias the surface into a high level of detection sensitivity to the infra-red frequency band of low level signals, and circuit means for providing an output correlative with the sharp rise characteristics of the electron emission provided thereby.

References Cited in the file of this patent
UNITED STATES PATENTS

| | | |
|---|---|---|
| 2,074,226 | Kunz et al. | Mar. 16, 1937 |
| 2,128,270 | Spanner et al. | Aug. 30, 1938 |
| 2,216,265 | Farnsworth | Oct. 1, 1940 |
| 2,231,610 | Becker | Feb. 11, 1941 |
| 2,258,294 | Lubsynski et al. | Oct. 7, 1941 |
| 2,335,659 | Fraenckel et al. | Nov. 30, 1943 |
| 2,505,060 | Oliver | Apr. 25, 1950 |
| 2,572,494 | Krieger et al. | Oct. 23, 1951 |
| 2,575,033 | Szegho | Nov. 13, 1951 |
| 2,612,610 | Marshall et al. | Sept. 30, 1952 |